Patented Mar. 24, 1931

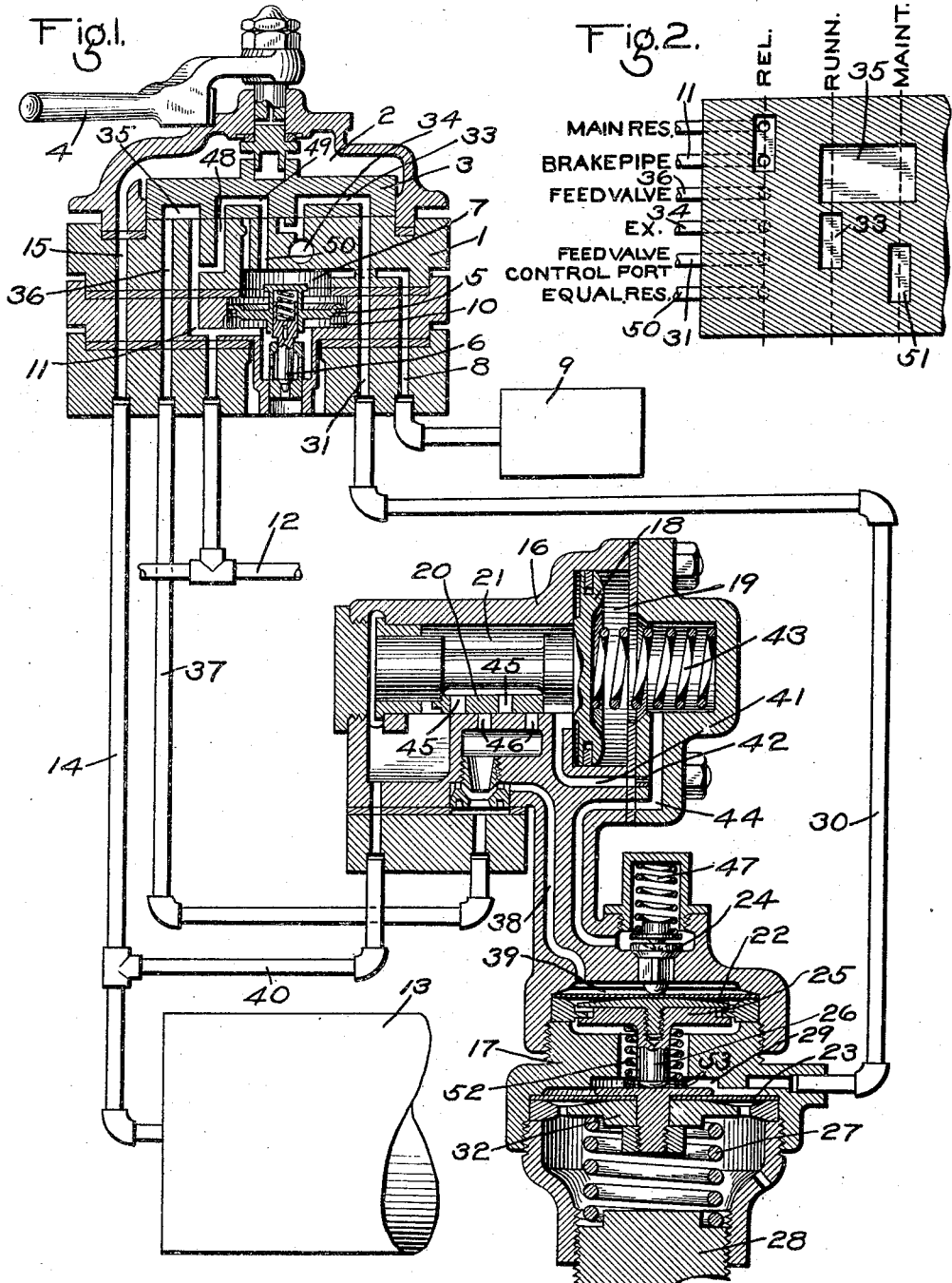

1,797,410

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FEED-VALVE DEVICE

Application filed April 2, 1929. Serial No. 351,840.

This invention relates to fluid pressure brakes, and more particularly to means for supplying fluid under pressure to the brake pipe of a fluid pressure brake system.

With the usual fluid pressure brake system, a feed valve device is provided on the locomotive, which is operative when the brake valve device is in running position, to maintain the brake pipe pressure, against leakage, at the predetermined degree of pressure normally carried in the system.

It has also been proposed to provide a maintaining valve device which is operative to maintain the brake pipe pressure, when the brakes are applied, at a predetermined degree corresponding with the reduced brake pipe pressure as effected by operation of the brake valve device in effecting an application of the brakes.

One object of my invention is to provide a single valve device for maintaining the brake pipe pressure both while the brakes are released and when the brakes are applied.

Other objects and advantages will appear in the following more detailed description of the invention.

In the accompanying drawing; Fig. 1 is a diagrammatic sectional view of a brake valve device and a brake pipe pressure maintaining valve device embodying my invention; and Fig. 2 a diagram, showing the port connections made when the brake valve device is in the specified positions.

The brake valve device 1 may be of the usual type comprising casing sections and having a valve chamber 2 containing a rotary slide valve 3, adapted to be operated by a handle 4. Mounted in the casing is the usual equalizing discharge valve mechanism comprising a piston 5 and a discharge valve 6, adapted to be operated by said piston.

The chamber 7 at the upper side of piston 5 is connected through passage 8 with the usual equalizing reservoir 9 and chamber 10 at the opposite side is connected through passage 11 with the usual brake pipe 12. The usual main reservoir 13 is connected through pipe 14 and passage 15 with the rotary valve chamber 2.

According to a preferred form of my invention, the combined feed and maintaining valve device may comprise a supply portion 16 and a regulating portion 17.

The supply portion comprises a piston 18 contained in piston chamber 19, and a supply valve 20 contained in valve chamber 21, and adapted to be operated by piston 18. The regulating portion comprises a pair of flexible diaphragms 22 and 23, the diaphragm 22 being preferably of smaller area than the diaphragm 23 and being adapted to operate a valve 24 for varying the fluid pressure in piston chamber 19.

A follower plate 25 engages the opposite side of diaphragm 22 and is provided with a stem 26 in operative engagement with the diaphragm 23. A follower plate 32 at the opposite side of the diaphragm 23 is engaged by an adjustable coil spring 27, and the pressure of said spring on the diaphragm may be adjusted by means of a screw plug 28.

The chamber 29 intermediate the diaphragms 22 and 23 is connected through a pipe 30 with a passage 31 which leads to the seat of the rotary valve 3.

When the brake valve device is in running position, as shown in Fig. 1, passage 31 is connected through cavity 33 in the rotary valve 3 with atmospheric exhaust port 34, so that the chamber 29 of the feed and maintaining valve device is maintained at atmospheric pressure.

The brake pipe 12 is connected through passage 11, cavity 35 in rotary valve 3, and passage 36, to pipe 37, leading to the feed valve device, and said pipe is connected, through passage 38, with diaphragm chamber 39. The diaphragm 22 is therefore subject to brake pipe pressure, and if the pressure in the brake pipe should fall below a predetermined degree, as determined by the setting of the spring 27, the diaphragm 23 and the diaphragm 22 will be deflected upwardly, so that the valve 24 will be unseated.

The valve chamber 21 is connected through pipe 40 with the main reservoir 13 and fluid under pressure equalizes from valve chamber 21, through passage 41 and a restricted port 42 into piston chamber 19, permitting the spring 43 to maintain piston 18 in its left hand position.

When the valve 24 is unseated, fluid under pressure is vented from the piston chamber 19, through passage 44, and past the valve 24 to passage 38 and the pipe 37, so that the higher pressure in valve chamber 21 shifts piston 18 and slide valve 20 toward the right, until ports 45 register with passages 46 and then fluid under pressure from the valve chamber 21 and the main reservoir 13 is supplied to the pipe 37 and through cavity 35 in the rotary valve 3 to the brake pipe.

When the brake pipe pressure has been increased by flow from the main reservoir to a degree slightly exceeding the opposing pressure of the spring 27, the diaphragm 22 is deflected downwardly, permitting the valve 24 to be seated by spring 47.

The fluid pressures on opposite sides of the piston 18 then equalize through the port 42, so that the spring 43 operates to move piston 18 and slide valve 20 to the left, so as to cut off the further flow of fluid under pressure to the brake pipe.

The feed and maintaining valve device then operates the same as the usual feed valve device heretofore employed to maintain the pressure in the brake pipe against leakage, while the brake valve device remains in running position.

In running position, the chamber 7 and the equalizing reservoir 9 are charged with fluid at brake pipe pressure, through passage 48, cavity 49 in rotary valve 3 and passage 50, and when the brake valve device is turned to service application position, a cavity in the rotary valve 3 connects chamber 7 with the atmosphere, so that fluid under pressure is vented from chamber 7 and from the equalizing reservoir in the usual manner, until the pressure has been reduced to the desired degree, when the brake valve handle may be turned to maintaining position, if it is desired to maintain the brake pipe pressure at the predetermined reduced degree of pressure.

The reduced pressure in chamber 7 causes the piston 5 to be moved upwardly by the higher brake pipe pressure in chamber 10, so that the discharge valve 6 is unseated to vent fluid under pressure from chamber 10 and the brake pipe until the brake pipe pressure in chamber 10 has been reduced to a degree slightly less than the reduced pressure in chamber 7, when the piston 5 operates to move the valve 6 to its seat and cut off the further venting of fluid from the brake pipe, in the usual manner.

In the maintaining position of the brake valve device, passage 31 is connected, through a cavity 51 in the rotary valve 3 with passage 50, while the feed valve passage 36 remains connected to brake pipe passage 11.

Fluid at equalizing reservoir pressure is therefore supplied through pipe 30 to chamber 29 of the feed valve device in the maintaining position of the brake valve device, and the area of diaphragm 23 is such that this pressure will deflect the diaphragm 23 downwardly against the opposing pressure of spring 27, so that the diaphragm 23 will not act through stem 26 on the diaphragm 22, and consequently the operation of diaphragm 22 will not be influenced by the pressure of spring 27.

The diaphragm 22 is now subject to and is controlled by the equalizing pressure in chamber 29 and the pressure of a biasing spring 52. The spring 52 acts on the diaphragm 22 with sufficient force to compensate for frictional resistance of the parts to movement, the pressure of spring 47, and variations in the initial deflection of the diaphragm 22. The spring 52 should therefore preferably be adjusted to balance the above forces for the individual feed valve device and the spring may be adjusted in any desired manner, such as by the use of one or more shims 53, interposed between the diaphragm 23 and the end of the spring.

If there is no leakage, the reduced brake pipe pressure acting on diaphragm 22 in chamber 39 will be the same as the equalizing reservoir pressure acting on the diaphragm in chamber 29 and the valve 24 will then be held seated by a slight preponderance of the spring 47.

If, however, the brake pipe pressure should fall below the bottled up pressure in the equalizing reservoir 9, as by leakage from the brake pipe, then the higher pressure in chamber 29 will act on the diaphragm 22 so as to lift the valve 24 from its seat and thereby cause the operation of the supply portion of the feed valve device to supply fluid under pressure to the brake pipe to compensate for the loss in pressure, in the same manner as described in connection with maintaining the brake pipe pressure in running position.

The same valve device is thus adapted to maintain the brake pipe pressure both when the brakes are released and when the brakes are applied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of valve means for controlling the supply of fluid under pressure to the brake pipe and a valve device for controlling the operation of said valve means, said valve device being subject at one time to the opposing pressures of the brake pipe and a substantially constant pressure and at another time to the opposing pressures of the brake pipe and a pressure corresponding with the reduced pressure in the brake pipe when the brakes are applied.

2. In a fluid pressure brake, the combination with a brake pipe, of valve means for controlling the supply of fluid under pressure to the brake pipe, a spring, and a valve device subject at one time to the opposing pressures of the brake pipe and said spring for controlling the operation of said valve means and subject at another time to the opposing pressures of the brake pipe, and a fluid pressure corresponding with the pressure to which the brake pipe is reduced in applying the brakes.

3. In a fluid pressure brake, the combination with a brake pipe, of valve means for controlling the supply of fluid under pressure to the brake pipe, a spring, a valve device subject to the opposing pressures of the brake pipe and said spring for controlling the operation of said valve means, and means operated in applying the brakes for cutting out the action of said spring on said valve device.

4. In a fluid pressure brake, the combination with a brake pipe, of valve means for controlling the supply of fluid under pressure to the brake pipe, a spring, a valve device subject to the opposing pressures of the brake pipe and said spring for controlling the operation of said valve means, and means operated in applying the brakes for preventing said spring from acting on said valve device.

5. In a fluid pressure brake, the combination with a brake pipe, of valve means for controlling the supply of fluid under pressure to the brake pipe, a spring, a valve device subject to the opposing pressures of the brake pipe and said spring for controlling the operation of said valve means, and means operated in applying the brakes for eliminating the action of said spring on said valve device.

6. In a fluid pressure brake, the combination with a brake pipe, of valve means for controlling the supply of fluid under pressure to the brake pipe, a valve device subject to the opposing pressures of the brake pipe and a substantially constant pressure for controlling the operation of said valve means, and means operative in applying the brakes for subjecting said valve device to the opposing pressures of the brake pipe and a pressure corresponding with the pressure to which the brake pipe is reduced in applying the brakes.

7. In a fluid pressure brake, the combination with a brake pipe, a reduction in pressure in which, effects an application of the brakes, of a supply valve device for controlling the supply of fluid under pressure to the brake pipe, and a regulating valve device for controlling the operation of said supply valve device, and regulating valve device including a flexible diaphragm subject to the opposing pressures of the brake pipe and a spring, and means operated by fluid at the reduced pressure in the brake pipe in applying the brakes for eliminating the action of said spring on said diaphragm.

8. In a fluid pressure brake, the combination with a brake pipe, a reduction in pressure in which, effects an application of the brakes, of a supply valve device for controlling the supply of fluid under pressure to the brake pipe, and a regulating valve device for controlling the operation of said supply valve device, said regulating valve device including a flexible diaphragm subject to the opposing pressures of the brake pipe and a spring, means for subjecting said diaphragm to a fluid pressure corresponding with the reduced pressure in the brake pipe in applying the brakes, and means operated by the fluid pressure supplied to said diaphragm for preventing said spring from acting on said diaphragm.

9. In a fluid pressure brake, the combination with a brake pipe, of a supply valve device operated by a reduction in fluid pressure for supplying fluid under pressure to the brake pipe, a valve for venting fluid pressure from said valve device, a flexible regulating diaphragm, subject on one side to brake pipe pressure for operating said valve, a second flexible diaphragm operatively connected to said regulating diaphragm, a spring acting on said second diaphragm, the pressure of which is transmitted through the second diaphragm to the regulating diaphragm, and means for supplying fluid under pressure to said diaphragms in applying the brakes to subject the regulating diaphragm to fluid pressure and to move the second diaphragm out of its operative connection with the regulating diaphragm.

10. In a fluid pressure brake, the combination with a brake pipe, of an equalizing reservoir, a valve mechanism operated upon a reduction in equalizing reservoir pressure for effecting a reduction in brake pipe pressure, a brake valve device for effecting a reduction in equalizing reservoir pressure, a feed valve device comprising a supply valve device for supplying fluid under pressure to the brake pipe, and a regulating valve device subject to the opposing pressures of the brake pipe and the equalizing reservoir in applying the brakes for controlling the operation of said supply valve device, the brake valve device controlling communication through which fluid at equalizing reservoir pressure is supplied to said regulating valve device.

11. In a fluid pressure brake, the combination with a brake pipe, an equalizing reservoir, and means operated upon a reduction in equalizing reservoir pressure for effecting a reduction in brake pipe pressure, of a brake pipe feed and maintaining valve device comprising valve means for controlling the supply of fluid under pressure to the brake pipe, a valve for controlling the operation of said valve means, a regulating diaphragm subject on one side to brake pipe pressure for operating said valve, a spring opposing brake pipe pressure on said diaphragm, a second diaphragm interposed between the regulating diaphragm and said spring, and means for connecting said equalizing reservoir to said diaphragms, whereby the regulating diaphragm is subjected to the opposing pressures of the brake pipe and the equalizing reservoir and the second diaphragm is operated to release the regulating diaphragm from the pressure of said spring.

12. In a fluid pressure brake, the combination with a brake pipe, of a feed and maintaining valve device for controlling the supply of fluid under pressure to the brake pipe comprising a supply valve device operated by a reduction in fluid pressure for supplying fluid under pressure to the brake pipe, a valve for venting fluid from said supply valve device, a spring, a regulating diaphragm subject to the opposing pressures of said spring and the brake pipe for operating said valve, and a biasing spring also acting on said diaphragm.

In testimony whereof I have hereunto set my hand this 19th day of March, 1929.

CLYDE C. FARMER.